United States Patent
Sebastian

(10) Patent No.: US 10,437,925 B2
(45) Date of Patent: Oct. 8, 2019

(54) SYSTEM AND METHOD FOR AUTOMATED BOOK GENERATION

(71) Applicant: Reema Sebastian, Chicago, IL (US)

(72) Inventor: Reema Sebastian, Chicago, IL (US)

( * ) Notice: Subject to any disclaimer, the term of this patent is extended or adjusted under 35 U.S.C. 154(b) by 348 days.

(21) Appl. No.: 15/097,543

(22) Filed: Apr. 13, 2016

(65) Prior Publication Data

US 2016/0306785 A1    Oct. 20, 2016

Related U.S. Application Data

(60) Provisional application No. 62/147,913, filed on Apr. 15, 2015.

(51) Int. Cl.
| | |
|---|---|
| *A63F 9/24* | (2006.01) |
| *G06F 17/24* | (2006.01) |
| *G06F 3/0483* | (2013.01) |
| *A63F 13/655* | (2014.01) |
| *A63F 13/63* | (2014.01) |
| *G09B 5/06* | (2006.01) |

(52) U.S. Cl.
CPC ............ *G06F 17/248* (2013.01); *A63F 13/63* (2014.09); *A63F 13/655* (2014.09); *G06F 3/0483* (2013.01); *G09B 5/062* (2013.01)

(58) Field of Classification Search
CPC ...... A63F 13/655; A63F 13/63; G06F 3/0482; G06F 3/0483; G06F 17/248; G09B 5/062
See application file for complete search history.

(56) References Cited

U.S. PATENT DOCUMENTS

| | | | | |
|---|---|---|---|---|
| 9,024,972 | B1* | 5/2015 | Bronder | G06T 19/006 345/633 |
| 2011/0064388 | A1* | 3/2011 | Brown | G06T 13/20 386/285 |
| 2013/0305153 | A1* | 11/2013 | Schwarz | G09B 5/062 715/716 |
| 2016/0220903 | A1* | 8/2016 | Miller | A63F 13/537 |

\* cited by examiner

*Primary Examiner* — Steve Rowland
(74) *Attorney, Agent, or Firm* — Drinker Biddle & Reath LLP

(57) ABSTRACT

A method for producing readable display material by a computing device is described. A storyline is selected by the computing device from a plurality of storyline templates based on a user input. Personal information associated with a user, including at least a name and an image, is received by the computing device. A user interface having a game associated with the selected storyline is provided to the user by the computing device and interaction information associated with the user while playing the game are stored. The readable display material is generated by the computing device to be viewable on a product and to incorporate information including storyline information associated with the selected storyline, the personal information received from the user, and the interaction information associated with the interactions of the user while the user plays the game.

17 Claims, 11 Drawing Sheets

SYSTEM AND METHOD FOR AUTOMATED BOOK GENERATION

CROSS-REFERENCE TO RELATED APPLICATION

This disclosure claims the priority benefit of U.S. Provisional Patent Application No. 62/147,913, entitled "System and Method for Automated Book Generation" and filed on Apr. 15, 2015, the disclosure of which is incorporated herein by reference in its entirety.

BACKGROUND

Disclosed herein is a system and related method for automatically generating a book or other print material.

Creating personalized books is known, and in the known systems, a user can add personalization details to be incorporated into the book in some manner. Also, creating on-demand books at a localized location is also known.

SUMMARY

In an embodiment, a method for producing readable display material by a computing device includes selecting, by the computing device, a storyline from a plurality of storyline templates based on a user input. The method includes receiving, by the computing device, personal information associated with a user, including at least a name and an image. The method also includes providing, by the computing device, a user interface having a game associated with the selected storyline to the user and storing interaction information associated with the user while playing the game. The method includes generating, by the computing device, the readable display material to be viewable on a product and to incorporate information including i) storyline information associated with the selected storyline, ii) the personal information received from the user, and iii) the interaction information associated with the interactions of the user while the user plays the game.

In another embodiment, a system includes at least one computing device. The computing device provides a first user interface for a selection of a storyline from a plurality of storyline templates based on a user input. The computing device receives personal information associated with a user, including at least a name and an image captured by a camera. The computing device provides a second user interface having a game associated with the selected storyline to the user. The computing device stores interaction information associated with interactions of the user while the user plays the game. The computing device generates the readable display material to be viewable on a product and to incorporate information including i) storyline information associated with the selected storyline, ii) the personal information received from the user, and iii) the interaction information associated with the interactions of the user while the user plays the game.

DETAILED DESCRIPTION

Various embodiments of the presently described system and method provide a unique, personalized book-creating or printed-material-creating experience. Some preferred embodiments of the system and method are ideally designed, configured, or adapted for use by children aged three to eight. Other embodiments are designed, configured, or adapted for other suitable age groups. In an embodiment, the system is created as a kiosk at a location that can be visited by children, for example, a library, learning center, school, mall, store, or other suitable location. In other embodiments, the system is created as an application or "app" that is executed on a smart phone, on a personal computer (PC), or other suitable computing device. In some embodiments, a soft or hardcover book is produced, but in other embodiments, a different suitable form of print material is produced, for example, a poster, booklet, paper handout, or article of clothing (e.g., a shirt, hat, cape, or other suitable article). In some embodiments, readable display material is generated, for example, a file or electronic document that is viewable on an electronic document reader, smartphone, or tablet. Although the embodiments described herein generally refer to producing a "book" below, this term should be considered a proxy for any suitable form of print material or readable display material.

Figure 1A:
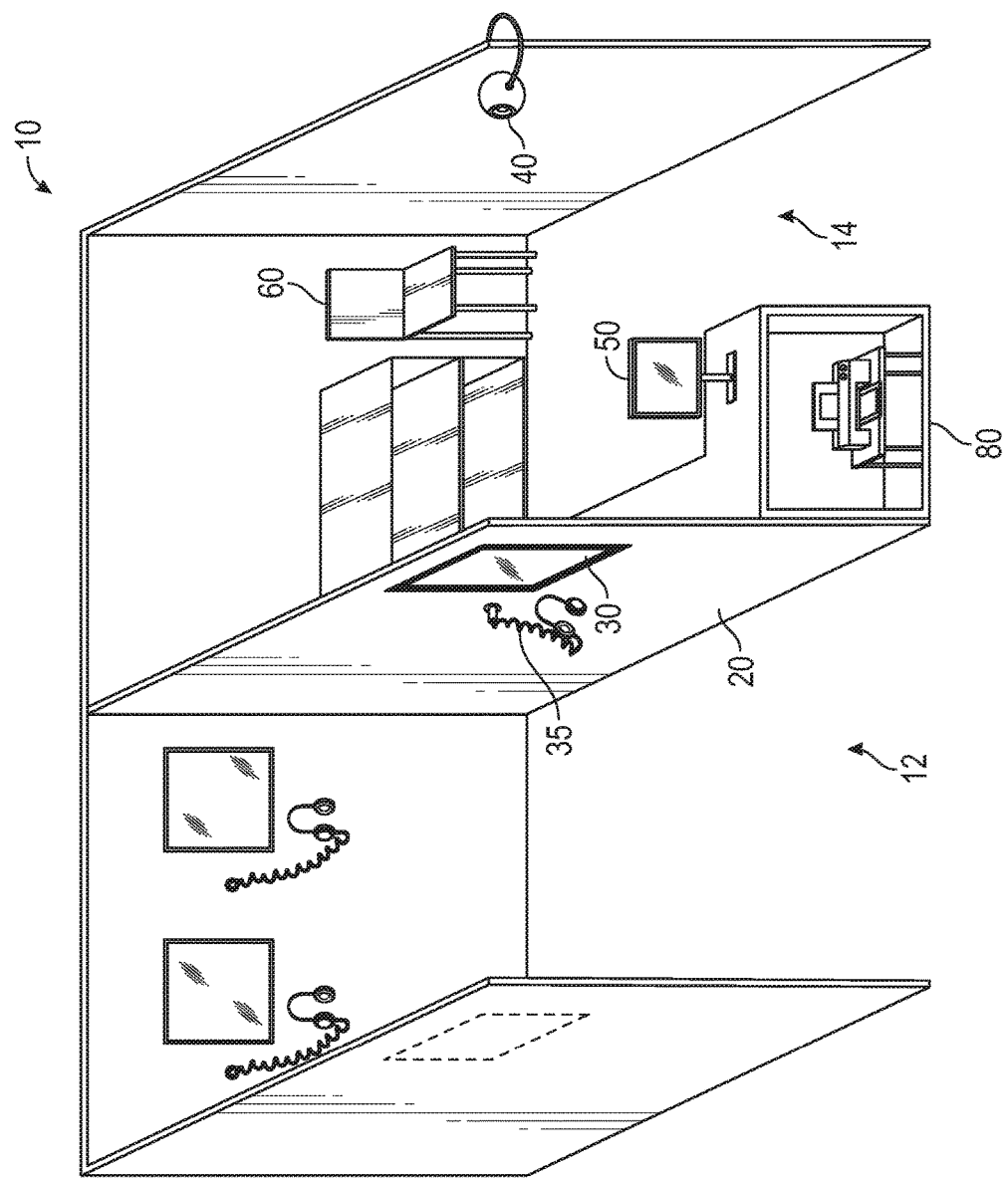
FIG. 1A is a perspective view of an example of a room for a kiosk system configured for book creation, according to an embodiment.

FIG. 1A shows an example kiosk system 10 having a layout divided into two primary areas: a play area 12 and a work area 14. In an embodiment, both areas are preferably surrounded by walls 20, and one wall 20 is used to separate the play area 12 and work area 14. The play area 12 in the embodiment shown in FIG. 1A contains one or more user interface devices 30, for example, tablets (i.e., a tablet computing device), touch screens, keyboards, joystick or gamepad controllers, or other suitable user interface devices (in the illustrated example, three tablets are provided), with tethered or wireless headphones 35. The kiosk system 10 also includes one or more computing devices 50, for example, a tablet computing device, laptop computer, personal computer, server, or other suitable computing device. In some embodiments, the user interface device 30 and computing device 50 are an integral device, for example, a tablet computing device or a computer with a monitor.

In some embodiments, the user interface device 30 includes a virtual reality (VR) interface (not shown), augmented reality interface (not shown), or holographic interface (not shown), for example, a VR headset (e.g., Oculus Rift, HTC Vive), wearable glasses or goggles that provide a suitable heads-up display (e.g., Google Glass), or smartphone VR adapter (e.g., Google Cardboard, Samsung Gear VR). In an embodiment, the user interface device of the play area 12 includes a holographic display (not shown). In some embodiments, the user interface device is connected with the computing device 50 that provides a suitable input signal. In some embodiments, the play area 12 includes a plurality of user interface devices 30, for example, a VR headset and a suitable gamepad controller. In an embodiment, the user interface device 30 includes a VR simulator (not shown) that provides motion and/or tactile feedback to the user, for example, by rotating, tilting, or bumping to simulate driving a car, flying a plane, piloting a submarine, or other suitable simulation for a game.

The play area 12 is where a child interacts with a user interface device 30 (e.g., the tablet or other suitable device) that provides or displays a story or portion thereof. The child provides user input via the user interface device 30 to assist in creating the story, for example, by preparing graphical objects to be incorporated into the story or by selecting or entering text to be incorporated into the story. In various embodiments, the user inputs for preparing the graphical object include identifying, selecting, or modifying existing graphical objects (e.g., default or previously stored graphical objects), or creating new graphical objects. The play area 12 also includes headphones 35 that are used to provide the child with an audio soundtrack to the story and/or suitable instructions, for example, game instructions or data entry instructions. Other types of user interface devices are used in other embodiments.

When the child visits the kiosk 10, as one embodiment, the child first enters the play area 12 and selects one of e.g., several pre-defined storylines using the user interface device 30. In other embodiments, the storyline is selected by a worker at the kiosk 10, for example, using the user interface device 30 or the computing device 50. In various embodiments, the storyline is a shell or template for a complete story, into which information relevant to the child (e.g., personal information, interaction information, or storyline information, as described herein) is incorporated by the kiosk 10 to finish the complete story. In an embodiment, the storyline includes a plot for a story and has one or more characters, objects (e.g., a car, toy, or house used by a character), or plot elements that are filled in with, or replaced by, the information relevant to the child. The child can then play one or more, but preferably three to four, interactive games via the user interface device 30 within the context of the storyline selected by the child. While playing these games, the user interface device 30 generates, based on input from the child via the user interface of the user interface device 30, interaction information that includes creative elements (e.g., graphical objects or text) which become a part of the personalized book to be produced by the kiosk 10. In some embodiments, the games provided by the user interface device 30 follow the plot of the selected storyline, or a portion thereof, and the book is a summary of the child's play-through of the games. In other embodiments, the games provided by the user interface device 30 provide an introduction to the story. In other words, the games provide a first portion or chapter of the story while the printed book provides a second portion or chapter of the story.

After generation of the creative elements, the child proceeds to the work area 14 where they provide relevant personal information, such as their name or other personal information that is entered via the computing device 50. In some embodiments, the computing device 50 includes a monitor, keyboard, mouse, or other suitable user interface device, and may also comprise a printer for printing out receipts or other business-related information. In an embodiment, the user interface device 30 (e.g., tablets) are used in place of the computing device 50 and receive the personal information. The child may sit in a chair 60 and have their photograph or digital image taken with a camera 40 (e.g., a web camera, universal serial bus camera, wireless camera, etc.) mounted on the wall or other suitable location—this configuration improves control over the image, for example, to capture a consistent headshot image of each child with similar lighting, camera angle, etc. However, in other embodiments, the user interface devices 30 (e.g., tablets) include a camera that is used to take the image as well. In some embodiments, the computing device 50 receives the image from another source, for example, read from a memory device provided by the user or downloaded from a remote server (e.g., via the Internet). The image is then stored in a storage area for later retrieval, for example, in a memory device (not shown) of the user interface device 30 or computing device 50.

In some embodiments, the image of the child is modified or processed by one or more filters or processors of the user interface device 30 or computing device 50, for example, to provide a "cartoonized" image of the child. In other words, the image of the child is processed to give the image an appearance more similar to a cartoon than to a photograph. The process for cartoonization is defined in more detail below. In some embodiments, an image of the child or a portion thereof is combined with an existing image. In an embodiment, for example, the user interface device 30 or computing device 50 extracts a headshot portion of an image of the child and combines the headshot portion with an existing image of cartoon-like character body so that the child appears to be a cartoon-like character in the cartoonized image. In another embodiment, for example, the user interface device 30 or computing device 50 combines the headshot portion with an existing image of a vehicle so that the child appears to be operating or driving the vehicle. Although a sequence of visiting the play area 12 first and visiting the work area 14 second is described, this sequence is not fixed and can easily be switched around, in other embodiments. In an embodiment, for example, the child provides the personal information before interacting with the games.

The work area 14 comprises a printer 80 for producing the books. In an embodiment, the printer 80 includes a desktop printer, a thermal binder, and a cover crimper for producing the books. In other embodiments, another suitable printer is used. In an embodiment, the printer 80 is configured to include one or more partially pre-printed pages that are completed by the printer 80 using the personal information and/or additional information. In some embodiments, the work area 14 includes an additional 3D printer (not shown) for producing objects associated with the storyline or created by the user. In an embodiment, a child creates a personalized safari truck via the user interface device 30 and the 3D printer creates a replica of the personalized safari truck.

In some embodiments, a network connection is provided to interconnect at least some of the user interface devices 30, computing device 50, camera 40, printer 80, or other electronic devices. This network connection may be a wireless connection and permit wireless devices, such as smart phones, to connect into the kiosk system 10 to provide information, control, etc. to the kiosk system 10. This networked system may be connected via a wide area network, such as the Internet, to a server at which relevant information, such as story templates, user identification information, such as names, pictures, etc. can be stored.

Figure 1C:
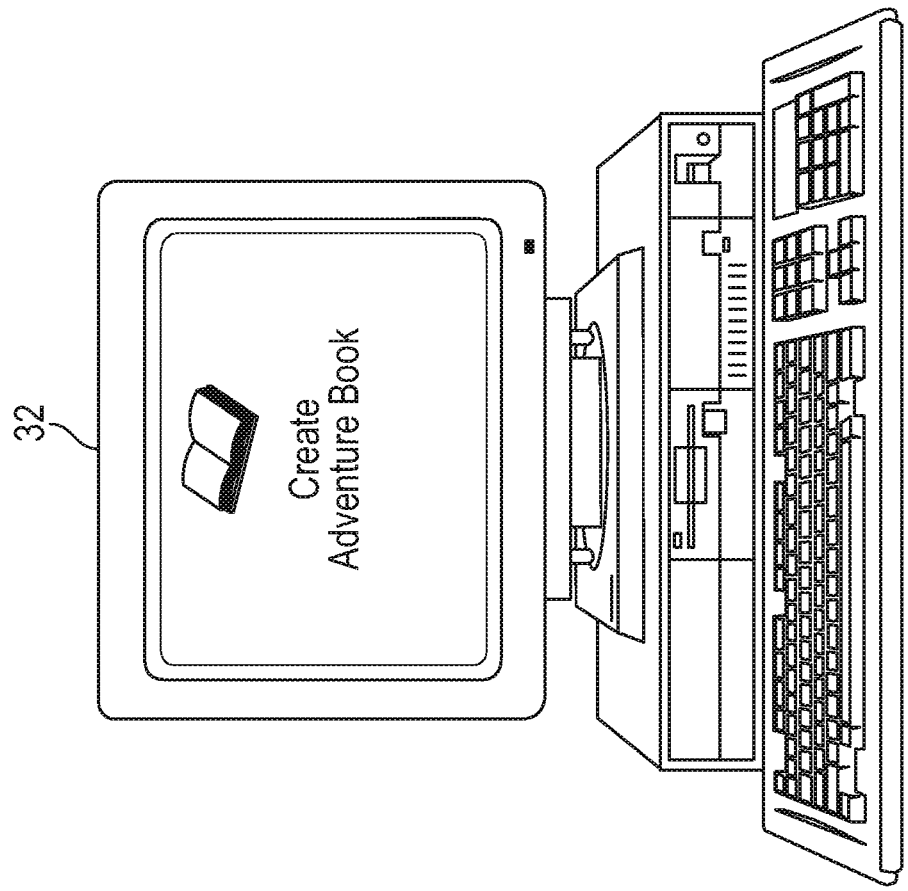
FIG. 1C is a diagram of an example of a personal computer configured for book creation, according to an embodiment.
Figure 1B:
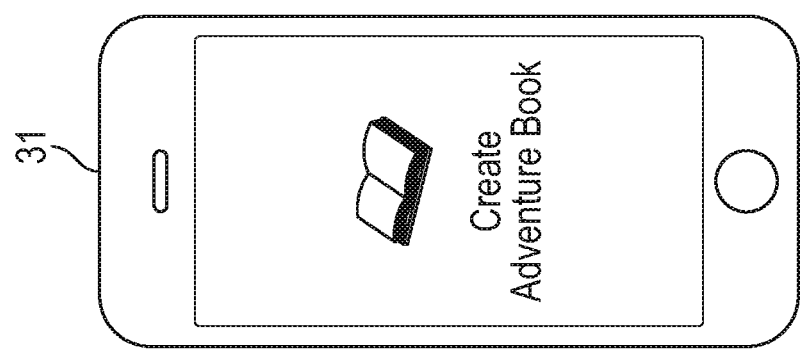
FIG. 1B is a diagram of an example of a smartphone configured for book creation, according to an embodiment.

In alternative embodiments, shown in FIGS. 1B and 1C, the system and method may be implemented as an application on a smartphone 31 or personal computer 32. In these embodiments, the camera 40 used to capture images is built in to the smartphone or is an external camera attached (e.g., wirelessly via Wi-Fi or Bluetooth or through a wired connection) to the PC. In some embodiments, instructions are provided to ensure that the proper image is taken—for example, an outline of a headshot is provided as a guide so that the correct positioning of the child for the picture is ensured. The picture is then uploaded for on-line storage at a storage area of the server. Storyline selection, purchase options, etc., can be selected via, e.g., option menus presented on the device, and the user can be prompted to enter all relevant information. In the non-kiosk embodiments, the relevant information for producing the book is sent to a server, and the user can be presented with an option for either picking the book up at a location that the user chooses, or having the book mailed to the user.

Figure 2A:
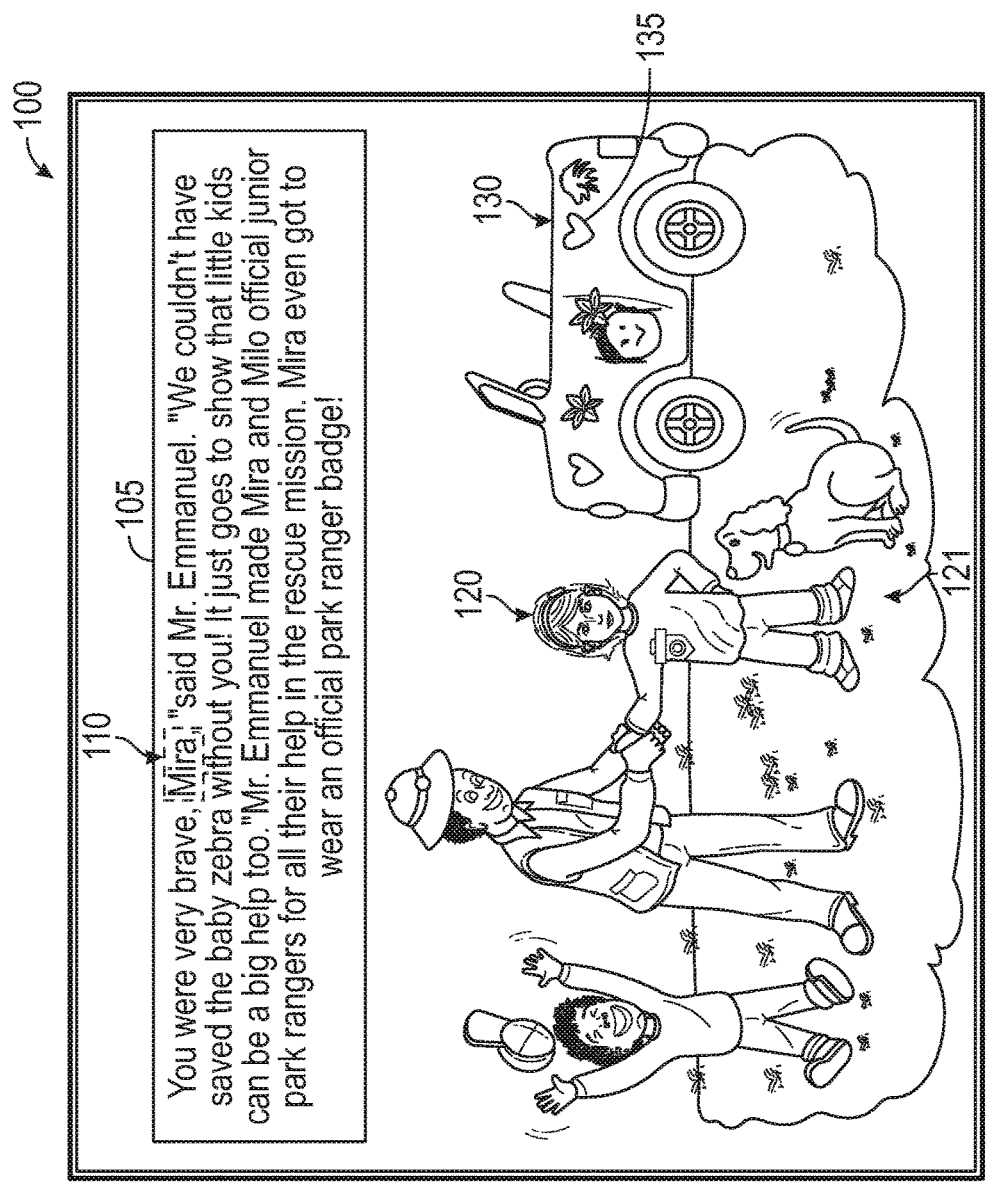
FIG. 2A is a diagram of an example of a user interface for a storyline, according to an embodiment.

FIG. 2A illustrates an example page 100 as part of a user interface for a safari adventure storyline that allows the child to design a safari truck or other suitable graphical object for the storyline, which is then incorporated into the story. In some embodiments, the example page 100 is incorporated into the book. As can be seen in FIG. 2A, the page includes a text box 105 that contains the child's name 110 that was previously entered via the user interface, an image of the child's face 120 (e.g., a cartoonized image, as described below), which was obtained earlier via the camera 40 and combined with the body image 121, and a safari truck 130. In an embodiment, the safari truck 130 is selected by the child from a predefined set of vehicles to use in the story, and then additionally provided with graphical embellishments 135 (e.g., icons or images) that can either be selected from a predefined group or drawn by the child themselves via the user interface. Once the child has finished participating in the adventure story, all pages making up the story that go into the book are collected and printed and bound by the kiosk system 10.

The process of selecting the storyline, entering information, playing the games, and printing the book is completed in a comparatively short period of time, for example, within thirty minutes, fifteen minutes or other suitable time period, once the child has completed working through the games/stories. Children will thus be able to leave the kiosk 10 with a personalized storybook featuring a cartoonized version of himself or herself as the protagonist or other suitable character. The final product may be a hardcover or softcover book that is printed and bound. Some examples of additional types of personalization that can be entered and incorporated within the storybook are listed below.

An individualized dedication page at the beginning of each book;
An "All About Me" page about the child at a suitable location within the book, for example, at the beginning, the end, or interleaved within pages of the book;
A coloring activity book containing personalized pages from the book that can be purchased as an add-on item;
An option to choose a storyline featuring two or more protagonists—the child and a parent, grandparent or aunt and uncle, pet, friend, etc. A cartoonized image of the others would also be part of the personalization;
An option to choose a storyline featuring two or more child protagonists, e.g., the child and their best friend(s). All children could play games in tangent (e.g., simultaneously as a multiplayer game) and each of the children could provide graphical objects or text that are featured in the story;
An option to choose a storyline featuring the child and an object or toy selected by the child. An image of the object or toy is captured via the camera 40 and incorporated into the story.
An option to create a personalized comic book;
In some of the storylines, the games themselves may be personalized. In an embodiment, in the safari adventure game for example, the safari truck 130 that the child creates in a first game is then incorporated into a second game where the safari truck 130 is driven by the child. In some storylines, a cartoonized version of the child is featured in the games.

The fact that the child, and not their caregivers, creates the book advantageously makes the book a much more unique and personalized book experience for the child because the child is directly involved in creating elements of the book. Furthermore, in the kiosk embodiment, the system may provide an actual physical experience for the child, since they are at a physical kiosk location. Once the book is printed, they can continue the experience at home while reading the book. In some embodiments, the kiosk 10 configuration is versatile because the primary tool used in the kiosk is a touchscreen tablet (e.g., user interface device 30), which can be configured and easily modified to accommodate new stories and other features. Although the embodiment shown in FIG. 1A uses touchscreen tablets 30 mounted on the wall, the tablets 30 are used in a portable manner in other embodiments. For example, if there is a sudden spike in demand, the customer capacity of the kiosk 10 could be expanded by handing out touchscreen tablets 30 to waiting customers.

Figure 2B:
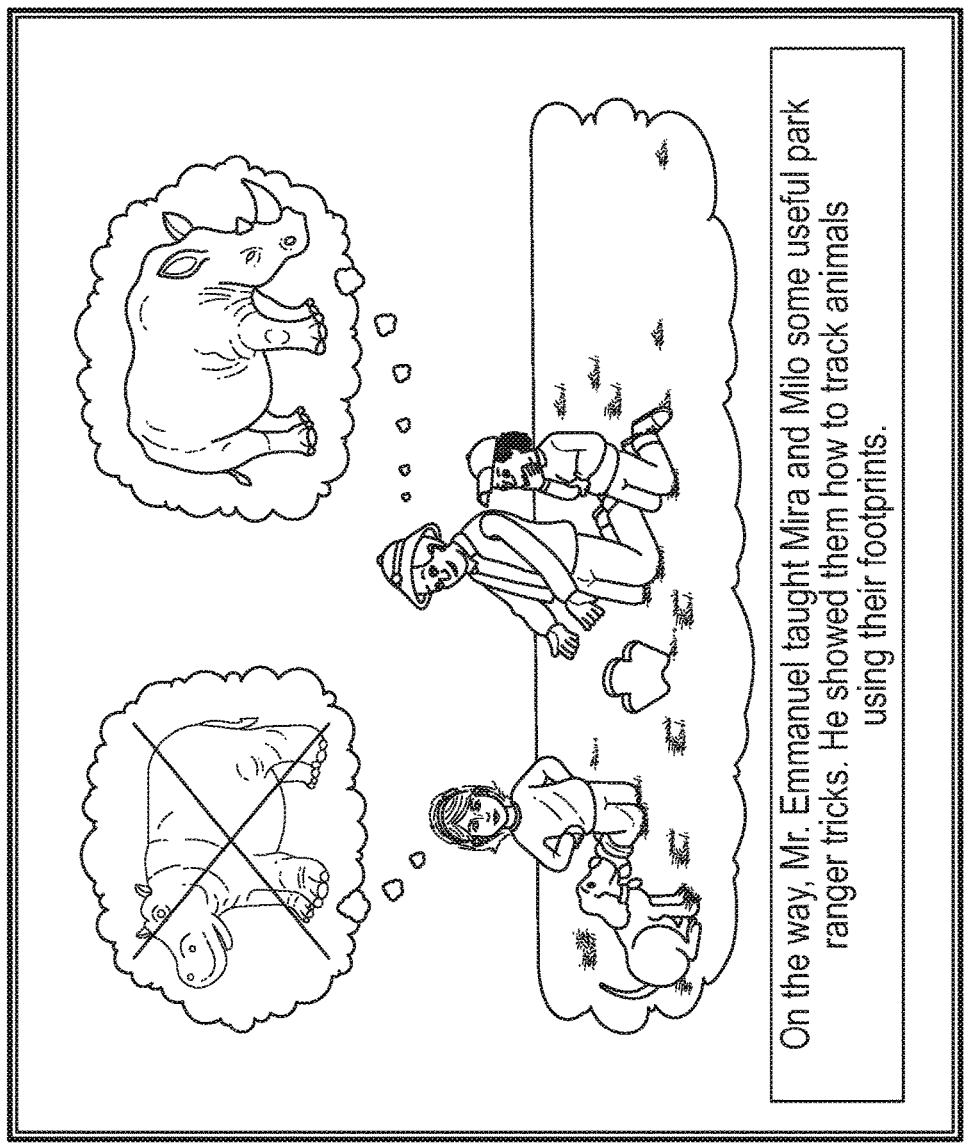
FIG. 2B is a diagram of an example of a user interface for a storyline, according to another embodiment.
Figure 2C:
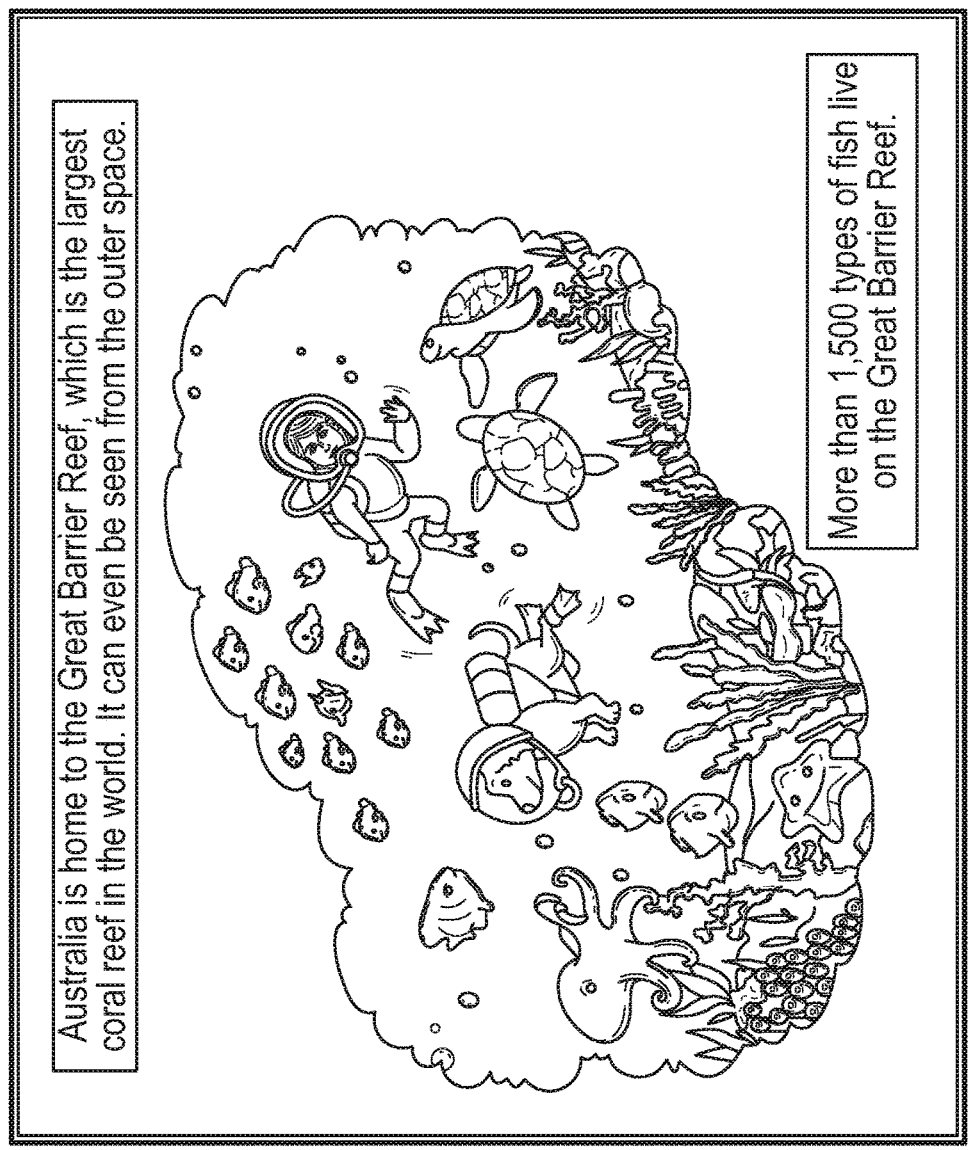
FIG. 2C is a diagram of an example of a user interface for a storyline, according to yet another embodiment.
Figure 3A:
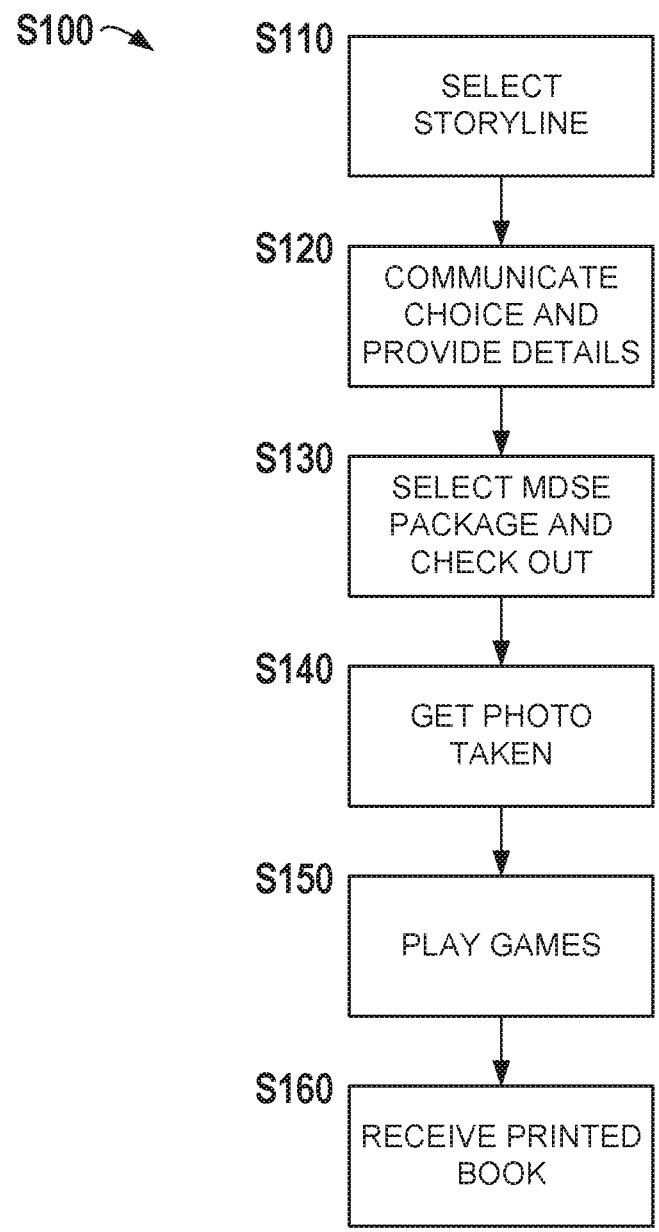
FIG. 3A is a flow diagram of an example method for book creation, according to an embodiment.

The process is discussed below with respect to the customer perspective and the kiosk worker perspective. FIG. 3A illustrates steps of the method (S100) from the customer perspective. The customer enters the kiosk system 10 and reviews sample storybooks that are on display and that can be used as a guide. Preferably, the sample storybooks are actual printed books, however, in other embodiments the storybooks are provided as electronic versions of the samples (or possibly show samples in both electronic and printed forms). From there, the customer can select one of a number of storylines (S110). By way of example, FIG. 2B illustrates a safari story, and FIG. 2C illustrates an underwater explorer story. In various embodiments, the pages shown in FIG. 2B and FIG. 2C are incorporated into the book.

Once a storyline has been selected, the customer checks in with a store clerk to communicate the story selection and provide personal information about the child (S120), to be entered via the user interface device 30 or computing device 50, as described above. The personal information provided may include the child's name and "all about me" details, as well as any other personalizing information. At this point, various merchandising options can be presented to the customer for purchase (S130).

The child may next have his/her image taken (S140) using the camera 40, and the image is stored away in a memory device either within the kiosk 10 (e.g., on the computing device 50) or on a remote server for subsequent use in the book. At this point, the child is invited to play the games (S150) provided by the user interface device 30, as described above. The kiosk employee can log the child into the system, e.g., via the tablet 30, and, based on the storyline selected, the child can play one or more games. In an embodiment, the number of games is three or four, and the overall play time is approximately fifteen minutes. In some embodiments, the storyline is intended to be both entertaining and educational for the child. For example, in the safari storyline in the embodiment illustrated in FIG. 2B, children can learn how to identify different animal tracks. Various elements created in this process (e.g., during game play) may be electronically associated to the child for incorporation into the book.

Figure 2D:
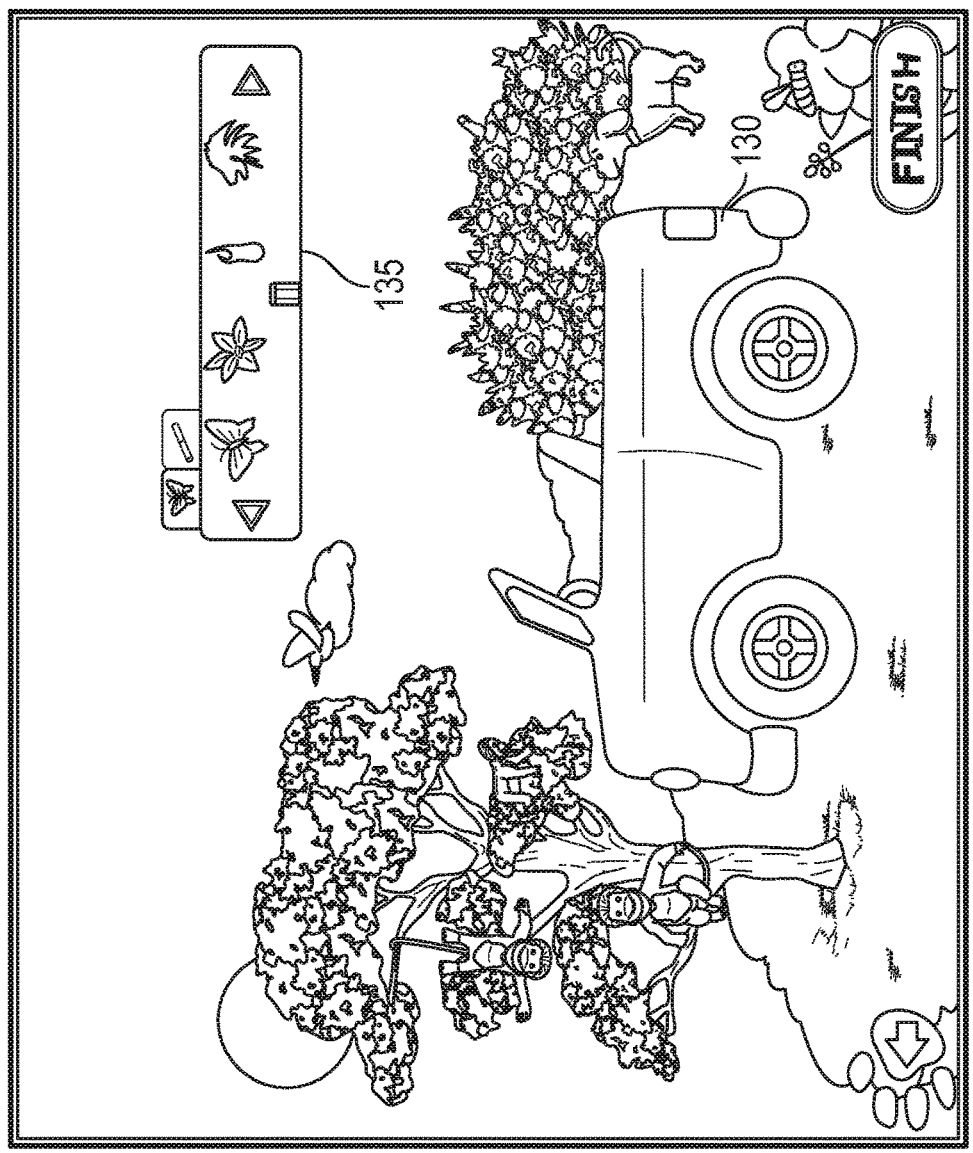
FIG. 2D is a diagram of an example of a user interface for a storyline, according to an embodiment.
Figure 2E:
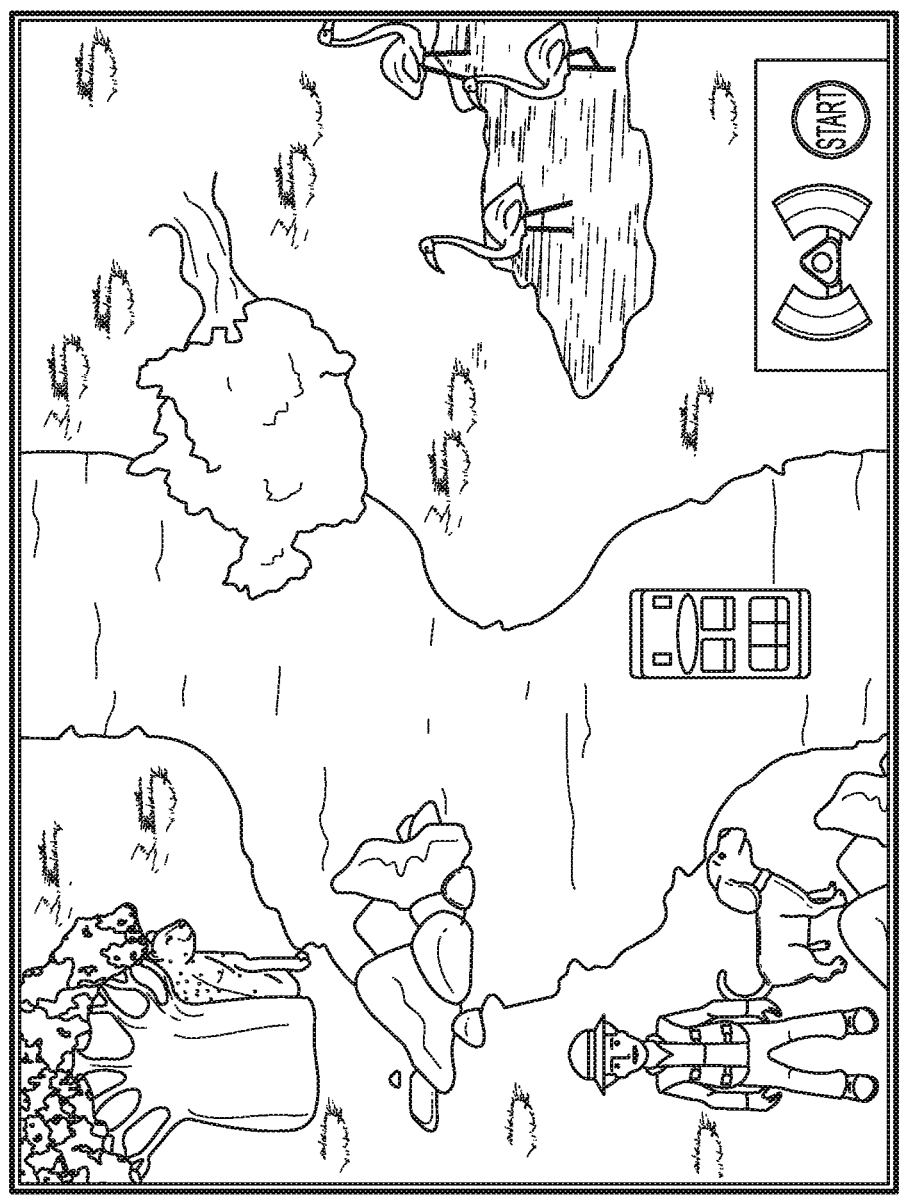
FIG. 2E is a diagram of an example of a user interface for a storyline, according to another embodiment.
Figure 2F:
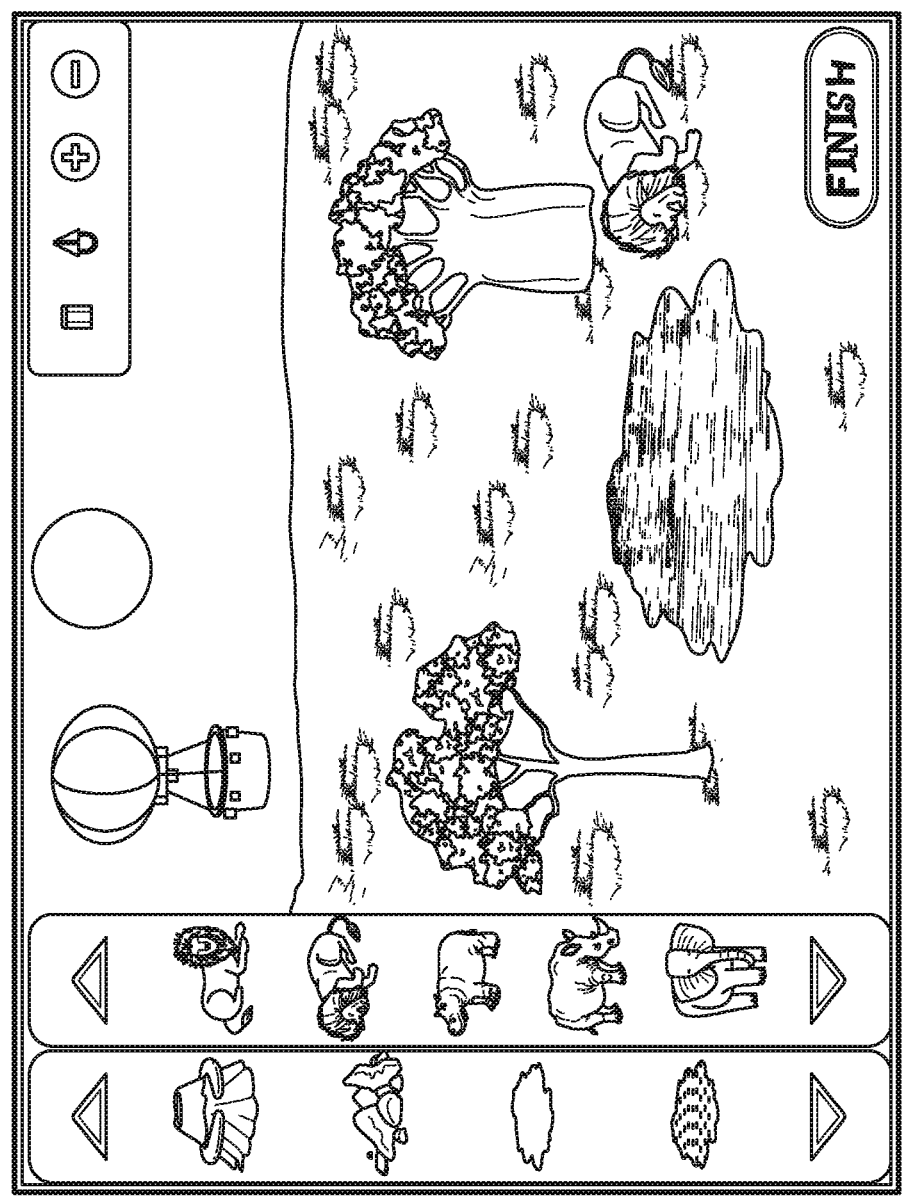
FIG. 2F is a diagram of an example of a user interface for a storyline, according to yet another embodiment.

FIGS. 2D-2F illustrate examples of various games and/or challenges that can be provided to the child. In FIG. 2D, the child can design, e.g., a safari truck 130 for transportation, adding in various design elements 135 to customize the safari truck 130 via the user interface provided by the user interface device 30. In FIG. 2E, the child can drive an obstacle course using the safari truck 130 via the user interface provided by the user interface device 30. Finally, in FIG. 2F, the child can design a safari scene that includes a number of predefined elements (e.g., graphical icons or images) via the user interface of the user interface device 30. In some embodiments, drawing tools are provided via the user interface for creation of new graphical objects by the child.

Once the games are completed by the child, the information regarding the games is sent to the tablet 30, computing device 50, or a remote server (not shown) so that the information can be integrated into the story. From the customer's perspective, the process ends by receiving a printed book (S160) that incorporates, e.g., the child's picture and other information, such as name, etc. Thus, the book contains the creative elements, pictures, and names specific to the child and their choices. In an embodiment, the personal information is stored on a server and is accessible in the future via social networking mechanisms—thus, the child can play the games on-line and repeatedly based on the saved information. In an embodiment, the customer receives a file or electronic document that is viewable on an electronic document reader, smartphone, or tablet, instead of, or in addition to, the printed book.

Figure 3B:
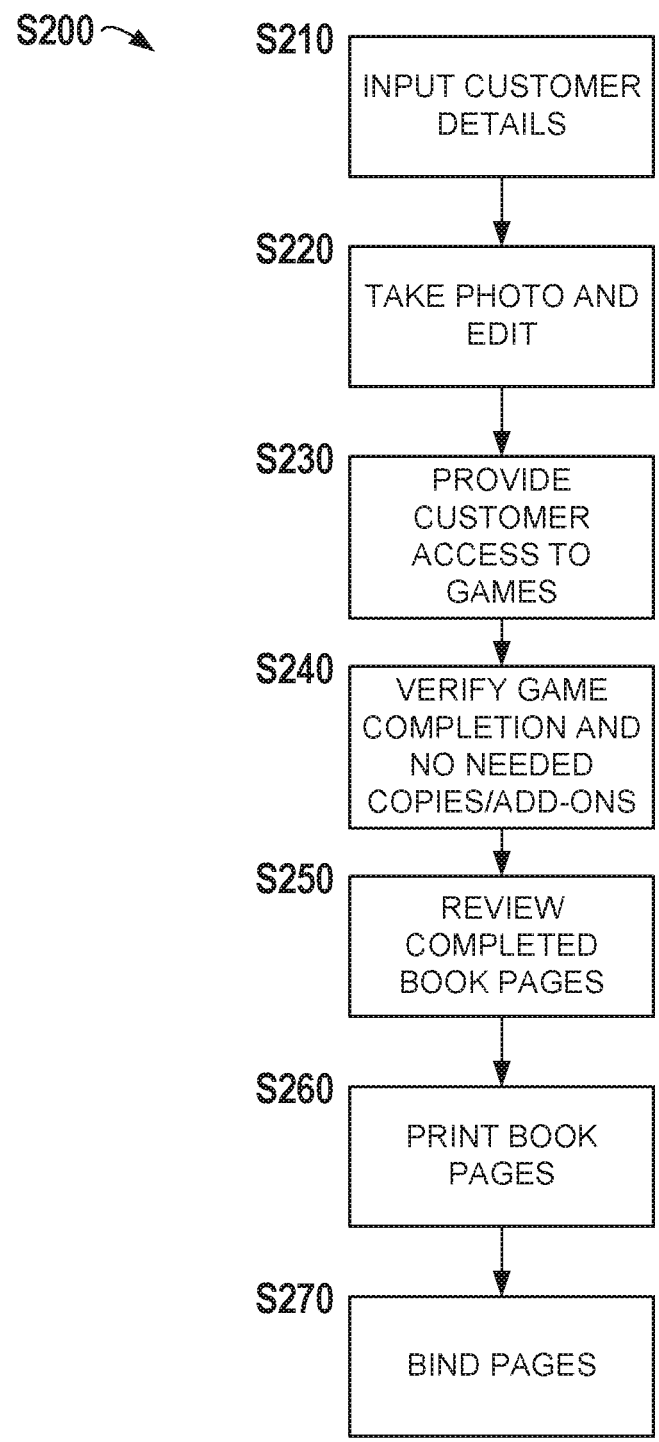
FIG. 3B is a flow diagram of an example method for book creation, according to another embodiment.

FIG. 3B is a flowchart of the method (S200) from the kiosk worker's standpoint. The kiosk worker obtains information regarding the child (S210), such as: a) the selected storyline, b) the child's name, c) dedication information, and d) details for the "All About Me" page. Any other suitable identifying information may be collected at this point. This information could be obtained/entered in any number of ways. In an embodiment, the kiosk worker asks the child a series of questions, and the kiosk worker enters information on the computing device 50. In another embodiment, the child is provided with the tablet 30 for entering the information in response to prompts via the user interface of the tablet 30.

Once the customer has chosen a desired package, an image of the child is captured via the camera 40 and the image is optionally edited or processed (S220). In an embodiment, a cartoonized image of the child is generated by the tablet 30 or computing device 50, and a visual verification may be performed by the kiosk worker to ensure that the child's likeness has been properly captured. The cartoonization utilizes the information from the image so that the final cartoonized image is easily recognizable as the child. In an embodiment, this is achieved by blending out some of the characteristics that make it photo-like and by also adding an outline around key parts of the image to make it appear more like an illustration than a photograph. By way of example only, Adobe Photoshop's® filters, such as Poster Edges, Topaz Filters, Cartoon Detailed, and Dark Strokes (for darker complexions) can be utilized. In this way, the child's likeness is preserved so that the child can recognize themselves in the image, but the image takes on an illustration-like nature.

The child may then be provided access (S230) to the games. This could be in the form of a login, an application authorization, or the like, by the kiosk worker. Advantageously, if the child has issues with proceeding during one or more portions of the creative, game playing process, the game can be restarted from an appropriate portion or "level" of the game. This permits adaptation and adjustment during the game playing process.

Once the child has completed the games, a verification is performed to ensure that there are no additional copies or add-on items required (S240). In an embodiment, pages that make up the child's experience are generated by the tablet 30 or computing device 50, for example, as portable document format (PDF) pages, that can be reviewed (S250) either electronically and/or printed and reviewed physically by the kiosk worker or child. Any desired editing or adjustments of the images can be made at this point, and the PDF pages or printed pages re-generated.

When the pages have been reviewed and are determined to have an acceptable, predetermined quality level, the book pages are printed (S260), and the pages are bound together (S270). In an embodiment, a thermal glue is used to bind the pages together—however, any suitable quick and efficient binding method may be utilized. In an embodiment, a hardcover is crimped to the bound pages, although a soft cover can be applied as well, in other embodiments. The book can then be presented to the customer, preferably in around fifteen minutes or less. In an embodiment, the customer receives a file or electronic document (e.g., the PDF generated at step S250) that is viewable on an electronic document reader, smartphone, or tablet, instead of, or in addition to, the printed book prepared in steps S260 and S270.

Figure 3C:
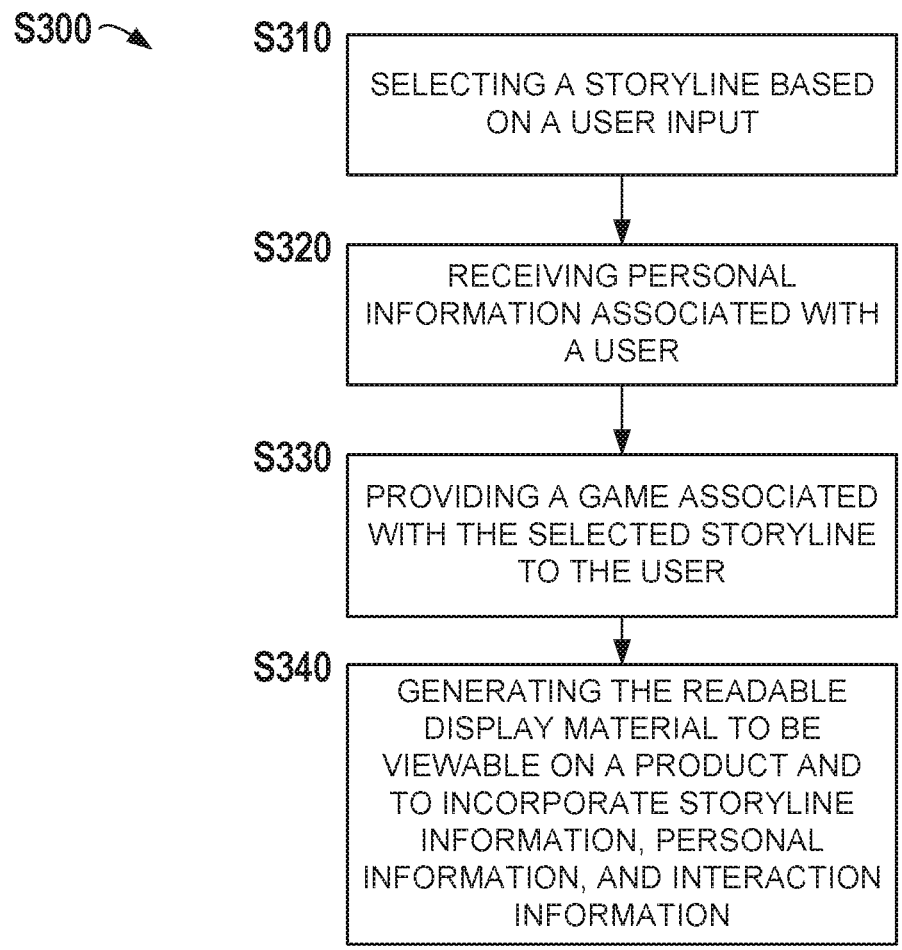
FIG. 3C is a flowchart of an example method for book creation as performed by the kiosk system of FIG. 1A, according to an embodiment.

FIG. 3C is a flowchart of an example method (S300) for producing readable display material, according to an embodiment. The method (S300) is performed by the kiosk system 10, for example, by the user interface device 30, the computing device 50, and/or the printer 80, in various embodiments.

A storyline is selected (S310) from a plurality of storyline templates based on a user input. In an embodiment, for example, the child selects a storyline from a plurality of pre-defined storylines via the user interface device 30 (e.g., the tablet, gamepad controller, etc.). In another embodiment, the kiosk worker selects a storyline via the computing device 50.

Personal information associated with the user is received (S320), including at least a name and an image. In an embodiment, for example, the child's name is entered via a user interface of the user interface device 30 or computing device 50 and the child's image is captured by the camera 40.

A user interface having a game associated with the selected storyline is provided (S330) to the user and interaction information associated with the user while playing the game is stored. In an embodiment, for example, a user interface as shown in FIG. 2D, 2E, or 2F is provided to the child via the user interface device 30, for example, via a tablet. In another embodiment, the user interface device 30 simulates a VR environment for the child as the game, for example, driving a car, flying a plane, piloting a submarine, or other suitable simulation. In an embodiment, the interaction information includes a description or summary of an activity performed while the user plays the game. In some embodiments, the interaction information includes a graphical object prepared by the child. In some embodiments, the user interface is generated to incorporate at least some of the personal information associated with the user into the game.

The readable display material is generated (S340) to be viewable on a product and to incorporate information including i) storyline information associated with the selected storyline, ii) the personal information received from the user, and iii) the interaction information associated with the interactions of the user while playing the game. In an embodiment, for example, the computing device 50 generates the readable display material so that the child's name, image, and other information are incorporated into the storyline. In various embodiments, the computing device 50 generates the readable display material to be viewable on a product. In some embodiments, the readable display material is caused to be printed on a product as printed material. In some embodiments, for example, the tablet 30 or computing device 50 transmits the readable display material to the printer 80 and, in response, the printer 80 generates a soft or hardcover book, poster, booklet, paper handout, or article of clothing. In an embodiment, pages of a book are printed to include the print material and the pages are then bound into a book. In another embodiment, the computing device 50 generates a file or electronic document that is readable by an electronic document reader. In other words, the product is printed material, or is an electronic document reader, smartphone, personal computer, or other suitable device, in various embodiments, and the child's name, image, and other information are incorporated into the storyline and viewable on the product.

In some embodiments, the user interface is generated to incorporate at least some of the personal information associated with the user into the game. In some embodiments, the image is an image of the user. In one such embodiment, the image of the user is processed to generate a cartoonized image. In an embodiment, the print material is generated to incorporate the cartoonized image into the print material. In another embodiment, the user interface having the game is generated to incorporate the cartoonized image.

In some embodiments, the user interface is a first user interface and a second user interface configured for preparation of a graphical object by the user is provided. The graphical object is received, prepared at least in part by the user, from the second user interface. In some embodiments, the print material is generated to incorporate the graphical object. In some embodiments, the first user interface having the game associated with the selected storyline is generated to incorporate the graphical object into the game. In an embodiment, the second user interface is generated for one or more of identifying, selecting, or modifying an existing graphical object, or creating a new graphical object based on user input from the user.

In some embodiments, the system includes a plurality of user interface devices that are simultaneously usable by the users. In this embodiment, a first user interface having a game is provided to a first user via a first user interface device, and a second user interface having the game is provided to a second user via a second user interface device. In this embodiment, two or more children can play a same or similar game and a product is generated that includes information from the children while playing the game. In other words, multiple children can play the games to generate respective books with shared information between the books. In an embodiment, each child receives a same book that is personalized to the children as a group. In another embodiment, each child receives a personalized book with shared information from the other children.

Although the output of the procedures and steps described above is a book, additional products are created that are based on the above storyline in some embodiments. These additional products include greeting cards, invitations, t-shirts, or any other form of printed material.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a non-volatile computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

Embodiments of the invention may be described in terms of functional block components and various processing steps. Such functional blocks may be realized by any number of hardware and/or software components that perform the specified functions. For example, the embodiments may employ various integrated circuit components, e.g., memory elements, processing elements, logic elements, look-up tables, and the like, which may carry out a variety of functions under the control of one or more microprocessors or other control devices. Similarly, where the elements are implemented using software programming or software elements, embodiments of the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, embodiments of the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

What is claimed is:

1. A method for producing readable display material by a computing device, comprising:
   selecting, by the computing device, a storyline from a plurality of storyline templates based on a user input;
   receiving, by the computing device, personal information associated with a user, including at least a name of the user and an image of the user captured by a camera;
   processing, by the computing device, the image of the user to generate a cartoonized image of the user, including extracting a headshot portion of the image, applying an image filter to the headshot portion to generate a filtered headshot image, and combining the filtered headshot image with at least one of i) an existing image of a cartoon-like character body so that the user appears to be a cartoon-like character in the cartoonized image, and ii) an existing image of a vehicle so that the user appears to be operating the vehicle in the cartoonized image;
   generating, by the computing device, a first user interface having a game that i) is associated with the selected storyline, and ii) includes the cartoonized image of the user as a character within the game;
   providing, by the computing device, the first user interface to the user and storing interaction information associated with the user while playing the game via the first user interface; and
   generating, by the computing device, the readable display material to be viewable on a product and to incorporate information including i) storyline information associated with the selected storyline, ii) the personal information received from the user, iii) the cartoonized image of the user, and iv) the interaction information associated with the interactions of the user while the user plays the game;
   wherein the cartoonized image includes the vehicle;
   wherein the method further comprises:
     providing a second user interface configured for drawing one or more graphical embellishments on the vehicle by the user;
     receiving the vehicle, designed at least in part by the user, from the second user interface; and
     generating the first user interface having the game to include the vehicle with the one or more graphical embellishments in the cartoonized image.

2. The method of claim 1, wherein the product is printed material and generating the readable display material comprises printing the readable display material as the printed material.

3. The method of claim 1, wherein the product is an electronic document reader and generating the readable display material comprises generating an electronic document that is readable by the electronic document reader.

4. The method of claim 1, wherein:
   the method further comprises:
     providing a third user interface configured for preparation of a graphical object by the user; and
     receiving the graphical object, prepared at least in part by the user, from the third user interface;
   generating the readable display material comprises generating the readable display material to incorporate the graphical object.

5. The method of claim 4, wherein providing the third user interface comprises generating the third user interface configured for one or more of identifying, selecting, or modifying an existing graphical object, or creating a new graphical object based on user input from the user.

6. The method of claim 4, wherein providing the first user interface having the game associated with the selected storyline comprises generating the first user interface to incorporate the graphical object into the game.

7. A system, comprising:
   at least one computing device;
   wherein the at least one computing device is configured to:
     provide a first user interface for a selection of a storyline from a plurality of storyline templates based on a user input,
     receive personal information associated with a user, including at least a name of the user and an image of the user captured by a camera,
     process the image of the user to generate a cartoonized image of the user, including being configured to extract a headshot portion of the image, apply an image filter to the headshot portion to generate a filtered headshot image, and combine the filtered headshot image with at least one of i) an existing image of a cartoon-like character body so that the user appears to be a cartoon-like character in the cartoonized image, and ii) an existing image of a vehicle so that the user appears to be operating the vehicle in the cartoonized image;

generate a second user interface having a game that i) is associated with the selected storyline, and ii) includes the cartoonized image of the user as a character within the game, provide the second user interface to the user, store interaction information associated with interactions of the user while the user plays the game via the second user interface, generate the readable display material to be viewable on a product and to incorporate information including i) storyline information associated with the selected storyline, ii) the personal information received from the user, iii) the cartoonized image of the user, and iv) the interaction information associated with the interactions of the user while the user plays the game;

wherein the cartoonized image includes the vehicle;

wherein the at least one computing device is configured to:

provide a third user interface configured for drawing one or more graphical embellishments on the vehicle by the user;

receive the vehicle, designed at least in part by the user, from the third user interface; and generate the second user interface to include the vehicle with the one or more graphical embellishments in the cartoonized image.

8. The system of claim 7, wherein:
the system includes a printer;
the product is printed material; and
the at least one computing device causes the printer to print the readable display material on the printed material.

9. The system of claim 7, wherein the at least one computing device:
provides a fourth user interface configured for preparation of a graphical object by the user;
receives the graphical object, prepared at least in part by the user, from the fourth user interface; and
generates the second user interface to incorporate the graphical object into the game.

10. The system of claim 9, wherein the at least one computing device generates the fourth user interface configured for one or more of identifying, selecting, or modifying an existing graphical object, or creating a new graphical object based on user input from the user.

11. The system of claim 7, wherein the at least one computing device:
provides a fourth user interface configured for preparation of a graphical object by the user;
receives the graphical object, prepared at least in part by the user, from the fourth user interface; and
generates the readable display material to incorporate the graphical object.

12. The system of claim 7, wherein:
the system further comprises a user interface device;
the at least one computing device provides the second user interface via the user interface device.

13. The system of claim 12, wherein the user interface device includes a tablet computing device, a virtual reality (VR) interface, an augmented reality interface, or a holographic interface.

14. The system of claim 12, wherein:
the user is a first user, and the user interface device is a first user interface device;
the system includes a second user interface device;
providing the second user interface having the game associated with the selected storyline comprises providing i) the second user interface having the game associated with the selected storyline to the first user via the first user interface device, and ii) a fourth user interface having the game associated with the selected storyline to the second user via the second user interface device and storing interaction information associated with the first user and the second user while playing the game.

15. The method of claim 1, wherein the cartoonized image includes the vehicle and the vehicle is one of a car, plane, and submarine.

16. The method of claim 1, wherein the user interface is a first user interface;
wherein the method further includes providing a second user interface configured for one or more of designing and modifying a background scene that corresponds to the selected storyline for the game by the user;
wherein generating the user interface having the game comprises generating the first user interface to include the background scene and the cartoonized image.

17. The system of claim 7, wherein the at least one computing device is configured to:
provide a fourth user interface configured for one or more of designing and modifying a background scene that corresponds to the selected storyline for the game by the user; and
generate the second user interface to include the background scene and the cartoonized image.

* * * * *